US010326520B2

(12) United States Patent
Ouyang et al.

(10) Patent No.: US 10,326,520 B2
(45) Date of Patent: Jun. 18, 2019

(54) METHOD AND APPARATUS FOR PROVIDING RELAY SERVICE USING A RELAY USER EQUIPMENT

(71) Applicant: HUAWEI TECHNOLOGIES CO., LTD., Shenzhen, Guangdong (CN)

(72) Inventors: Guowei Ouyang, Beijing (CN); Hui Jin, Beijing (CN); Qiang Yi, Beijing (CN); Yue He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 15/815,919

(22) Filed: Nov. 17, 2017

(65) Prior Publication Data

US 2018/0076879 A1    Mar. 15, 2018

Related U.S. Application Data

(63) Continuation of application No. PCT/CN2016/081896, filed on May 12, 2016.

(30) Foreign Application Priority Data

May 19, 2015   (CN) .......................... 2015 1 0254765

(51) Int. Cl.
  *H04W 72/12*    (2009.01)
  *H04B 7/155*    (2006.01)
  (Continued)

(52) U.S. Cl.
  CPC .......... *H04B 7/15528* (2013.01); *H04W 8/26* (2013.01); *H04W 72/0406* (2013.01);
  (Continued)

(58) Field of Classification Search
  CPC .......... H04W 72/0446; H04W 84/047; H04W 88/04; H04W 8/26
  See application file for complete search history.

(56) References Cited

U.S. PATENT DOCUMENTS

2011/0244851 A1* 10/2011 Gunnarsson ............ H04W 8/26
  455/423
2012/0092994 A1   4/2012 Wang et al.
  (Continued)

FOREIGN PATENT DOCUMENTS

CN   101990171 A   3/2011
CN   102036306 A   4/2011
  (Continued)

OTHER PUBLICATIONS

International Search Report dated Jul. 26, 2016 in corresponding International Patent Application No. PCT/CN2016/081896.
  (Continued)

*Primary Examiner* — Mewale A Ambaye
(74) *Attorney, Agent, or Firm* — Staas & Halsey LLP

(57) ABSTRACT

Embodiments of the present disclosure provide a method and an apparatus for providing a relay service. A second message sent by an MME is received by a P-GW, where the second message includes a first identifier of remote UE; an uplink packet filter of the remote UE is determined according to the first identifier of the remote UE; and an uplink TFT of relay UE is determined, where the uplink TFT includes the uplink packet filter of the remote UE, and the uplink packet filter of the remote UE is used by the relay UE to map an uplink data packet of the remote UE to an EPS bearer of the relay UE.

17 Claims, 7 Drawing Sheets

(51) Int. Cl.
 H04W 8/26 (2009.01)
 H04W 72/04 (2009.01)
 H04W 88/04 (2009.01)
 H04W 84/04 (2009.01)
(52) U.S. Cl.
 CPC ........ *H04W 88/04* (2013.01); *H04W 72/0446* (2013.01); *H04W 84/047* (2013.01)

(56) References Cited

U.S. PATENT DOCUMENTS

| | | | |
|---|---|---|---|
| 2015/0296535 A1 | 10/2015 | Lee et al. | |
| 2016/0302052 A1 | 10/2016 | Xu | |
| 2016/0360563 A1* | 12/2016 | Lecroart | H04L 69/322 |
| 2019/0037414 A1* | 1/2019 | Saito | H04W 16/26 |

FOREIGN PATENT DOCUMENTS

| | | |
|---|---|---|
| CN | 103118401 A | 5/2013 |
| CN | 104053191 A | 9/2014 |
| CN | 104053192 A | 9/2014 |
| CN | 104519550 A | 4/2015 |
| CN | 104584669 A | 4/2015 |
| WO | 2010/088804 A1 | 8/2010 |
| WO | 2013/163595 A2 | 10/2013 |

OTHER PUBLICATIONS

3GPP TS 22.278 V12.6.0 (Dec. 2014), "3rd Generation Partnership Project; Technical Specification Group Services and System Aspects; Service requirements for the Evolved Packet System (EPS)(Release 12)", Dec. 2014, 45 pp.
International Search Report dated Jul. 26, 2016 in corresponding International Application No. PCT/CN2016/081896.
NEC, "L2 ProSe UE-to-Network Relay alternative," SA WG2 Meeting #S2- 99, Sep. 23-28, 2013, XP50726722A, 8 pgs.
CATT, "Consideration for ProSe one to one communication and service continuity aspects," SA WG2 Meeting #106, Nov. 17-21, 2014, XP50881054A, 5 pgs.
Huawei, HiSilicon, "Considerations on ProSe Direct Communication packet filter," SA WG2 Meeting #107, Jan. 26-30, 2015, XP50942252A, 3 pgs.
Huawei, "Service continuity for Prose," SA WG2 Meeting #108, Apr. 13-17, 2015, XP50942707A, 5 pgs.
"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 13)" 3GPP TS 23.401, V13.2.0, Mar. 2015, XP50966485A, 313 pgs.
Extended European Search Report dated Mar. 9, 2018, in corresponding European Patent Application No. 16795834.7, 12 pgs.
Office Action, dated Jan. 2, 2019, in Chinese Application No. 201510254765.2 (10 pp.).

* cited by examiner

METHOD AND APPARATUS FOR PROVIDING RELAY SERVICE USING A RELAY USER EQUIPMENT

CROSS-REFERENCE TO RELATED APPLICATIONS

This application is a continuation of International Application No. PCT/CN2016/081896, filed on May 12, 2016, which claims priority to Chinese Patent Application No. 201510254765.2, filed on May 19, 2015. The disclosures of the aforementioned applications are hereby incorporated by reference in their entireties.

TECHNICAL FIELD

Embodiments of the present disclosure relate to communications technologies, and in particular, to a method and an apparatus for providing a relay service.

BACKGROUND

In wireless communications, to improve data transmission efficiency, a proximity service (ProSe) technology is used to enable user equipment (UE) outside coverage of a cell to communicate with a base station by using UE within coverage of the cell, thereby improving data transmission efficiency.

For ease of description, the UE outside coverage of the cell is referred to as remote UE (English: remote UE), and the UE within coverage of the cell is referred to as relay UE (English: relay UE). In the prior art, the remote UE determines the relay UE by using a discovery process in the ProSe technology, and establishes a connection and communication with the relay UE. The relay UE establishes a packet data network (PDN) connection corresponding to a serving/packet data network-gateway (S/P-GW), for transmitting data of the remote UE. The relay UE sends a request message to a mobility management entity (MME), where the request message indicates an access of the remote UE. The MME sends the request message to the S-GW. The S-GW forwards the request message to the P-GW. The P-GW allocates an Internet Protocol (IP) address and a corresponding uplink traffic flow template (TFT) to the remote UE. The P-GW sends the foregoing IP address and the uplink TFT to the relay UE by using the S-GW, the MME, and the base station in sequence. The relay UE sends the foregoing IP address to the remote UE. The remote UE may send the data to the relay UE by using the foregoing IP address, and the relay UE forwards the data to the base station by using the uplink TFT corresponding to the remote UE.

However, when the remote UE leaves coverage of the cell, and accesses a network (for example, the P-GW) by using the relay UE, a situation in which data sending and receiving stop may occur. Consequently, continuity of data transmission cannot be ensured.

SUMMARY

Embodiments of the present disclosure provide a method and an apparatus for providing a relay service, to ensure continuity of data transmission.

According to a first aspect, an embodiment of the present disclosure provides a method for providing a relay service, applied to a packet data network-gateway P-GW, including:

receiving a second message sent by a mobility management entity MME, where the second message includes a first identifier of remote UE;

determining an uplink packet filter of the remote UE according to the first identifier of the remote UE;

determining an uplink traffic flow template TFT of relay UE, where the uplink TFT includes the uplink packet filter of the remote UE, and the uplink packet filter of the remote UE is used by the relay UE to map an uplink data packet of the remote UE to an evolved packet data gateway EPS bearer of the relay UE; and sending a third message to the MME, where the third message includes the uplink TFT.

With reference to the first aspect, in a first possible implementation manner of the first aspect, the first identifier of the remote UE includes:

an international mobile subscriber identity IMSI of the remote UE or an Internet Protocol IP address of the remote UE.

With reference to the first aspect or the first possible implementation manner of the first aspect, in a second possible implementation manner of the first aspect, the third message further includes a first TFT, where the first TFT is used by the relay UE to route a downlink data packet of the remote UE to a bearer on a PC5, and the PC5 is an interface between the relay UE and the remote UE.

With reference to the second possible implementation manner of the first aspect, in a third possible implementation manner of the first aspect, the method further includes:

receiving a fifth message sent by the MME, where the fifth message is used to request for a bearer resource; and updating a downlink TFT of the relay UE according to the fifth message, where the downlink TFT includes a downlink packet filter of the remote UE, and the downlink packet filter of the remote UE is used to map the downlink data packet of the remote UE to the EPS bearer of the relay UE.

According to a second aspect, an embodiment of the present disclosure provides a method for providing a relay service, applied to relay user equipment UE, including:

sending a first message to a mobility management entity MME, where the first message is used to request to provide a relay service to remote UE, and the first message includes a globally unique temporary identity GUTI of the remote UE;

receiving a fourth message sent by the MME, where the fourth message includes an uplink traffic flow template TFT, and the uplink TFT includes an uplink packet filter of the remote UE;

mapping an uplink data packet of the remote UE to an evolved packet data EPS bearer of the relay UE according to the uplink TFT; and sending the uplink data packet of the remote UE to a packet data network-gateway P-GW by using the EPS bearer of the relay UE.

With reference to the second aspect, in a first possible implementation manner of the second aspect, the fourth message further includes a first TFT; and the method further includes:

routing a downlink data packet of the remote UE to a bearer on a PC5 according to the first TFT, where the PC5 is an interface between the relay UE and the remote UE.

With reference to the second aspect, in a second possible implementation manner of the second aspect, after the receiving a fourth message sent by the MME, the method further includes:

generating a first TFT; and routing a downlink data packet of the remote UE to a bearer on a PC5 according to the first TFT, where the PC5 is an interface between the relay UE and the remote UE.

With reference to the second aspect or the first possible implementation manner or the second possible implementation manner of the second aspect, in a third possible implementation manner of the second aspect, before the sending a first message to an MME, the method further includes:

receiving attach request information or a tracking area update message sent by the remote UE, where the attach request information or the tracking area update message is used by an original MME corresponding to the remote UE to verify the remote UE.

With reference to any one of the second aspect, or the first possible implementation manner to the third possible implementation manner of the second aspect, in a fourth possible implementation manner of the second aspect, the first message further includes a second identifier of the remote UE; and the second identifier is used by the MME to determine an address of the P-GW of the remote UE, and establish a packet data network PDN connection between the relay UE and the P-GW.

With reference to the fourth possible implementation manner of the second aspect, in a fifth possible implementation manner of the second aspect, the second identifier is a linked EPS bearer identifier LBI or an access point name APN.

According to a third aspect, an embodiment of the present disclosure provides a method for providing a relay service, applied to a mobility management entity MME, including:

receiving a first message sent by relay user equipment UE, where the first message is used to request to provide a relay service to remote UE, and the first message includes a globally unique temporary identity GUTI of the remote UE;

obtaining a first identifier of the remote UE according to the GUTI of the remote UE;

sending a second message to a packet data network-gateway P-GW, where the second message includes the first identifier of the remote UE;

receiving a third message sent by the P-GW, where the third message includes an uplink traffic flow template TFT, the uplink TFT includes an uplink packet filter of the remote UE, and the uplink packet filter of the remote UE is used by the relay UE to map an uplink data packet of the remote UE to an evolved packet data EPS bearer of the relay UE; and sending a fourth message to the relay UE, where the fourth message includes the uplink TFT.

With reference to the third aspect, in a first possible implementation manner of the third aspect, the identifier of the remote UE includes: an international mobile subscriber identity IMSI of the remote UE or an Internet Protocol IP address of the remote UE.

With reference to the third aspect or the first possible implementation manner of the third aspect, in a second possible implementation manner of the third aspect, the third message further includes a first TFT, the first TFT is used by the relay UE to route a downlink data packet of the remote UE to a bearer on a PC5, and the PC5 is an interface between the relay UE and the remote UE; and the fourth message further includes the first TFT.

With reference to the third aspect or the first possible implementation manner or the second possible implementation manner of the third aspect, in a third possible implementation manner of the third aspect, after the sending a fourth message to the relay UE, the method further includes:

sending the fifth message to the P-GW, where the fifth message is used to request for a bearer resource, the fifth message is used to cause the P-GW to update a downlink TFT of the relay UE, the downlink TFT includes a downlink packet filter of the remote UE, and the downlink packet filter of the remote UE is used to map the downlink data packet of the remote UE to the EPS bearer of the relay UE.

With reference to any one of the third aspect, or the first possible implementation manner to the third possible implementation manner of the third aspect, in a fourth possible implementation manner of the third aspect, the obtaining a first identifier of the remote UE according to the GUTI of the remote UE includes:

obtaining context information of the remote UE according to the GUTI of the remote UE, and obtaining the first identifier of the remote UE from the context information of the remote UE.

With reference to the fourth possible implementation manner of the third aspect, in a fifth possible implementation manner of the third aspect, the obtaining context information of the remote UE according to the GUTI of the remote UE includes:

determining, according to the GUTI of the remote UE, an original mobility management entity MME corresponding to the remote UE;

sending a sixth message to the original MME, where the sixth message is used to obtain the context information of the remote UE, and the sixth message includes the GUTI of the remote UE; and receiving the context information of the remote UE that is sent by the original MME.

With reference to the fifth possible implementation manner of the third aspect, in a sixth possible implementation manner of the third aspect, the sixth message further includes attach request information or a tracking area update message, and the attach request information or the tracking area update message is used by the original MME to verify the remote UE.

With reference to the fifth possible implementation manner or the sixth possible implementation manner of the third aspect, in a seventh possible implementation manner of the third aspect, the first message further includes a second identifier of the remote UE; and after the receiving the context information of the remote UE that is sent by the original MME, the method further includes:

determining an address of the P-GW according to the second identifier of the remote UE, and establishing a packet data network PDN connection between the relay UE and the P-GW.

With reference to the seventh possible implementation manner of the third aspect, in an eighth possible implementation manner of the third aspect, the second identifier is a linked EPS bearer identifier LBI or an access point name APN.

According to a fourth aspect, an embodiment of the present disclosure provides an apparatus for providing a relay service, applied to a packet data network-gateway P-GW, including:

a receiving module, configured to receive a second message sent by a mobility management entity MME, where the second message includes a first identifier of remote UE;

a processing module, configured to determine an uplink packet filter of the remote UE according to the first identifier of the remote UE, where the processing module is further configured to determine an uplink traffic flow template TFT of relay UE, where the uplink TFT includes the uplink packet filter of the remote UE, and the uplink packet filter of the remote UE is used by the relay UE to map an uplink data packet of the remote UE to an evolved packet data gateway EPS bearer of the relay UE; and a sending module, configured to send a third message to the MME, where the third message includes the uplink TFT.

With reference to the fourth aspect, in a first possible implementation manner of the fourth aspect, the first identifier of the remote UE includes:

an international mobile subscriber identity IMSI of the remote UE or an Internet Protocol IP address of the remote UE.

With reference to the fourth aspect or the first possible implementation manner of the fourth aspect, in a second possible implementation manner of the fourth aspect, the third message further includes a first TFT, the first TFT is used by the relay UE to route a downlink data packet of the remote UE to a bearer on a PC5, and the PC5 is an interface between the relay UE and the remote UE.

With reference to the second possible implementation manner of the fourth aspect, in a third possible implementation manner of the fourth aspect, the receiving module is further configured to: receive a fifth message sent by the MME, where the fifth message is used to request for a bearer resource; and the processing module is further configured to update a downlink TFT of the relay UE according to the fifth message, where the downlink TFT includes a downlink packet filter of the remote UE, and the downlink packet filter of the remote UE is used to map the downlink data packet of the remote UE to the EPS bearer of the relay UE.

According to a fifth aspect, an embodiment of the present disclosure provides an apparatus for providing a relay service, applied to relay user equipment UE, including:

a sending module, configured to send a first message to a mobility management entity MME, where the first message is used to request to provide a relay service to remote user equipment UE, and the first message includes a globally unique temporary identity GUTI of the remote UE;

a receiving module, configured to receive a fourth message sent by the MME, where the fourth message includes an uplink traffic flow template TFT, and the uplink TFT includes an uplink packet filter of the remote UE; and a processing module, configured to map an uplink data packet of the remote UE to an evolved packet data EPS bearer of the relay UE according to the uplink TFT, where the sending module is further configured to send the uplink data packet of the remote UE to a packet data network-gateway P-GW by using the EPS bearer of the relay UE.

With reference to the fifth aspect, in a first possible implementation manner of the fifth aspect, the fourth message further includes a first TFT; and the processing module is further configured to route a downlink data packet of the remote UE to a bearer on a PC5 according to the first TFT, where the PC5 is an interface between the relay UE and the remote UE.

With reference to the fifth aspect, in a second possible implementation manner of the fifth aspect, the processing module is further configured to: generate a first TFT, and route a downlink data packet of the remote UE to a bearer on a PC5 according to the first TFT, where the PC5 is an interface between the relay UE and the remote UE.

With reference to the fifth aspect or the first possible implementation manner or the second possible implementation manner of the fifth aspect, in a third possible implementation manner of the fifth aspect, the receiving module is further configured to receive attach request information or a tracking area update message sent by the remote UE, where the attach request information or the tracking area update message is used by an original MME corresponding to the remote UE to verify the remote UE.

With reference to any one of the fifth aspect, or the first possible implementation manner to the third possible implementation manner of the fifth aspect, in a fourth possible implementation manner of the fifth aspect, the first message further includes a second identifier of the remote UE; and the second identifier is used by the MME to determine an address of the P-GW of the remote UE, and establish a packet data network PDN connection between the relay UE and the P-GW.

With reference to the fourth possible implementation manner of the fifth aspect, in a fifth possible implementation manner of the fifth aspect, the second identifier is a linked EPS bearer identifier LBI or an access point name APN.

According to a sixth aspect, an embodiment of the present disclosure provides an apparatus for providing a relay service, applied to a mobility management entity MME, including:

a receiving module, configured to receive a first message sent by relay user equipment UE, where the first message is used to request to provide a relay service to remote UE, and the first message includes a globally unique temporary identity GUTI of the remote UE;

a processing module, configured to obtain a first identifier of the remote UE according to the GUTI of the remote UE; and a sending module, configured to send a second message to a packet data network-gateway P-GW, where the second message includes the first identifier of the remote UE, where the receiving module is further configured to receive a third message sent by the P-GW, where the third message includes an uplink traffic flow template TFT, the uplink TFT includes an uplink packet filter of the remote UE, and the uplink packet filter of the remote UE is used by the relay UE to map an uplink data packet of the remote UE to an evolved packet data EPS bearer of the relay UE; and the sending module is further configured to send a fourth message to the relay UE, where the fourth message includes the uplink TFT.

With reference to the sixth aspect, in a first possible implementation manner of the sixth aspect, the identifier of the remote UE includes: an international mobile subscriber identity IMSI of the remote UE or an Internet Protocol IP address of the remote UE.

With reference to the sixth aspect or the first possible implementation manner of the sixth aspect, in a second possible implementation manner of the sixth aspect, the third message further includes a first TFT, the first TFT is used by the relay UE to route a downlink data packet of the remote UE to a bearer on a PC5, and the PC5 is an interface between the relay UE and the remote UE; and the fourth message further includes the first TFT.

With reference to the sixth aspect or the first possible implementation manner or the second possible implementation manner of the sixth aspect, in a third possible implementation manner of the sixth aspect, the sending module is further configured to send the fifth message to the P-GW, where the fifth message is used to request for a bearer resource, the fifth message is used to cause the P-GW to update a downlink TFT of the relay UE, the downlink TFT includes a downlink packet filter of the remote UE, and the downlink packet filter of the remote UE is used to map the downlink data packet of the remote UE to the EPS bearer of the relay UE.

With reference to any one of the sixth aspect, or the first possible implementation manner to the third possible implementation manner of the sixth aspect, in a fourth possible implementation manner of the sixth aspect, the processing module is specifically configured to: obtain context information of the remote UE according to the GUTI of the remote UE, and obtain the first identifier of the remote UE from the context information of the remote UE.

With reference to the fourth possible implementation manner of the sixth aspect, in a fifth possible implementation manner of the sixth aspect, the processing module is specifically configured to determine, according to the GUTI of the remote UE, an original mobility management entity MME corresponding to the remote UE;

the sending module is further configured to send a sixth message to the original MME, where the sixth message is used to obtain the context information of the remote UE, and the sixth message includes the GUTI of the remote UE; and the receiving module is further configured to receive the context information of the remote UE that is sent by the original MME.

With reference to the fifth possible implementation manner of the sixth aspect, in a sixth possible implementation manner of the sixth aspect, the sixth message further includes attach request information or a tracking area update message, and the attach request information or the tracking area update message is used by the original MME to verify the remote UE.

With reference to the fifth possible implementation manner or the sixth possible implementation manner of the sixth aspect, in a seventh possible implementation manner of the sixth aspect, the first message further includes a second identifier of the remote UE; and the processing module is further configured to: determine an address of the P-GW according to the second identifier of the remote UE, and establish a packet data network PDN connection between the relay UE and the P-GW.

With reference to the seventh possible implementation manner of the sixth aspect, in an eighth possible implementation manner of the sixth aspect, the second identifier is a linked EPS bearer identifier LBI or an access point name APN.

By means of the method and apparatus for providing a relay service provided in the embodiments of the present disclosure, a second message sent by an MME is received by a P-GW, where the second message includes a first identifier of remote UE; an uplink packet filter of the remote UE is determined according to the first identifier of the remote UE; and an uplink TFT of relay UE is determined, where the uplink TFT includes the uplink packet filter of the remote UE, and the uplink packet filter of the remote UE is used by the relay UE to map an uplink data packet of the remote UE to an EPS bearer of the relay UE. The uplink TFT includes the uplink packet filter of the remote UE, where the uplink packet filter of the remote UE is used by the relay UE to map the uplink data packet of the remote UE to the EPS bearer of the relay UE, the uplink packet filter of the remote UE is determined by the P-GW according to an existing context of the remote UE, and the context includes an IP address of the remote UE. Therefore, it is ensured that an IP address that is used by the remote UE when accessing a network by using the relay UE is consistent with an IP address that is used by the remote UE when accessing the network within coverage of a cell, thereby ensuring continuity of data transmission.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments of the present disclosure described herein can be, for example, implemented in orders except those illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

An IP address that is obtained from a P-GW by remote UE when accessing, within coverage of a cell, a network may be different from an IP address that is obtained from the P-GW by the remote UE when accessing, outside coverage of the cell, the network by using relay UE. As a result, a server communicating with the remote UE needs to obtain the IP address of the remote UE again to continue communication. Consequently, continuity of data transmission cannot be ensured. A problem of the continuity of data transmission is resolved in the present disclosure by using the following embodiments.

Figure 1:
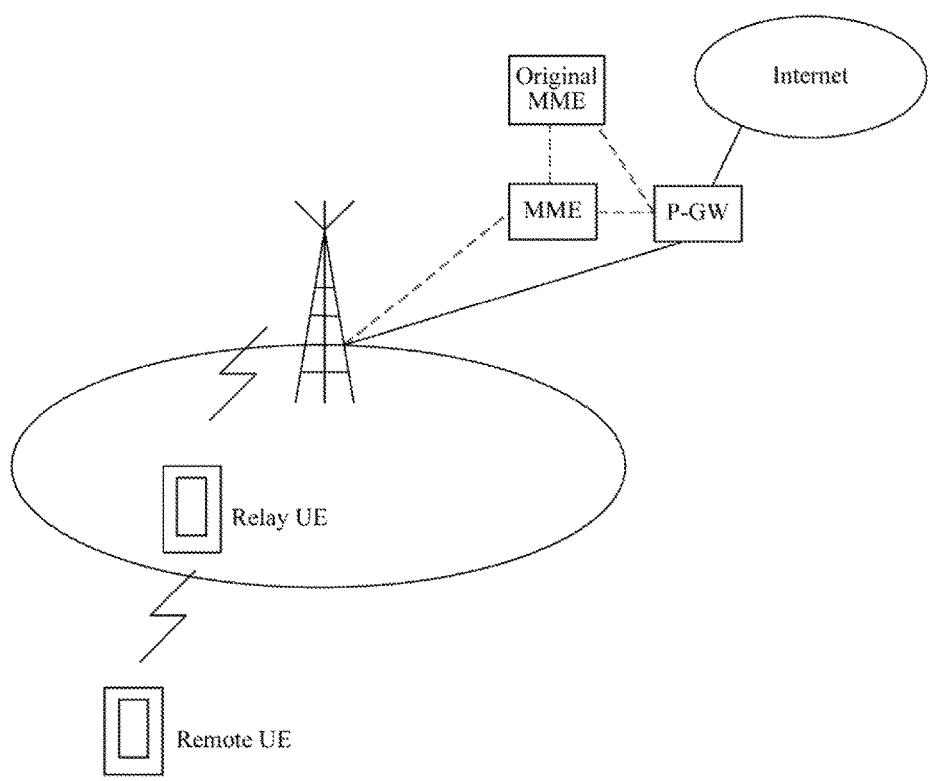
FIG. 1 is a schematic diagram of an application scenario of the present disclosure.

FIG. 1 is a schematic diagram of an application scenario of the present disclosure. As shown in FIG. 1, remote UE is outside coverage of a cell, and the remote UE accesses a network by using relay UE that is within coverage of the cell. Specifically, the remote UE sends a message including a globally unique temporary identity (GUTI) of the remote UE to the relay UE; the relay UE sends the message including the GUTI of the remote UE to an MME; and the MME obtains a first identifier of the remote UE according to the GUTI of the remote UE. Specifically, if the MME and an MME for the remote UE to access the network when the remote UE is within coverage of the cell are a same MME, the MME obtains a context of the remote UE according to the GUTI of the remote UE, and obtains the first identifier of the remote UE according to the context of the remote UE. If the MME and an MME for the remote UE to access the network when the remote UE is within coverage of the cell are different MMEs, for ease of description, the MME for the remote UE to access the network when the remote UE is within coverage of the cell is referred to as an original MME. The MME sends the GUTI of the remote UE to the original MME, where the original MME is the MME for the remote UE to access the network when the remote UE is within coverage of the cell. The original MME obtains a context of the remote UE according to the GUTI of the remote UE, and obtains the first identifier of the remote UE according to the context of the remote UE. The first identifier may be, for example, an international mobile subscriber identity (IMSI) or an IP address. The MME sends the first identifier of the remote UE to a P-GW. The P-GW determines an uplink traffic flow template (TFT) according to the first identifier of the remote UE. The uplink TFT includes an uplink packet filter (English full name: Uplink Packet Filter) that is used by the relay UE to map an uplink data packet of the remote UE to an evolved packet data gateway (English full name: Evolved Packet System, EPS for short) bearer of the relay UE. Main content of the packet filter is an IP quintuple (a source address\a destination address\a source port\a destination port\a number of an application layer protocol over IP). The P-GW sends the uplink TFT to the relay UE by using an S-GW, the MME, and a base station. After receiving the data packet sent by the remote UE, the relay UE forwards data according to the packet filter in the uplink TFT. The uplink TFT includes the uplink packet filter used by the relay UE to map the uplink data packet of the remote UE to the EPS bearer of the relay UE. The uplink packet filter is determined by the P-GW of the remote UE according to the existing context of the remote UE, and the context includes the IP address of the remote UE. Therefore, it is ensured that an IP address that is used by the remote UE when accessing the network by using the relay UE is consistent with an IP address that is used by the remote UE when accessing the network within coverage of the cell, thereby ensuring continuity of data transmission.

The following describes technical solutions of the present disclosure in detail by using specific embodiments. The following several specific embodiments may be mutually combined. Same or similar concepts or processes may not be described in detail in some embodiments.

The technical solutions of the present disclosure may be applied to different application scenarios. A detailed description is given below by using several common application scenarios as an example.

In a first scenario, remote UE accesses a network by using relay UE, and an MME for accessing the network is the same as an MME for the remote UE to access the network when the remote UE is within coverage of a cell.

In a second scenario, remote UE accesses a network by using relay UE, and an MME for accessing the network is different from an MME for the remote UE to access the network when the remote UE is within coverage of a cell.

In a third scenario, a P-GW for remote UE to access a network last time is different from a P-GW for accessing the network by using relay UE.

Figure 2:
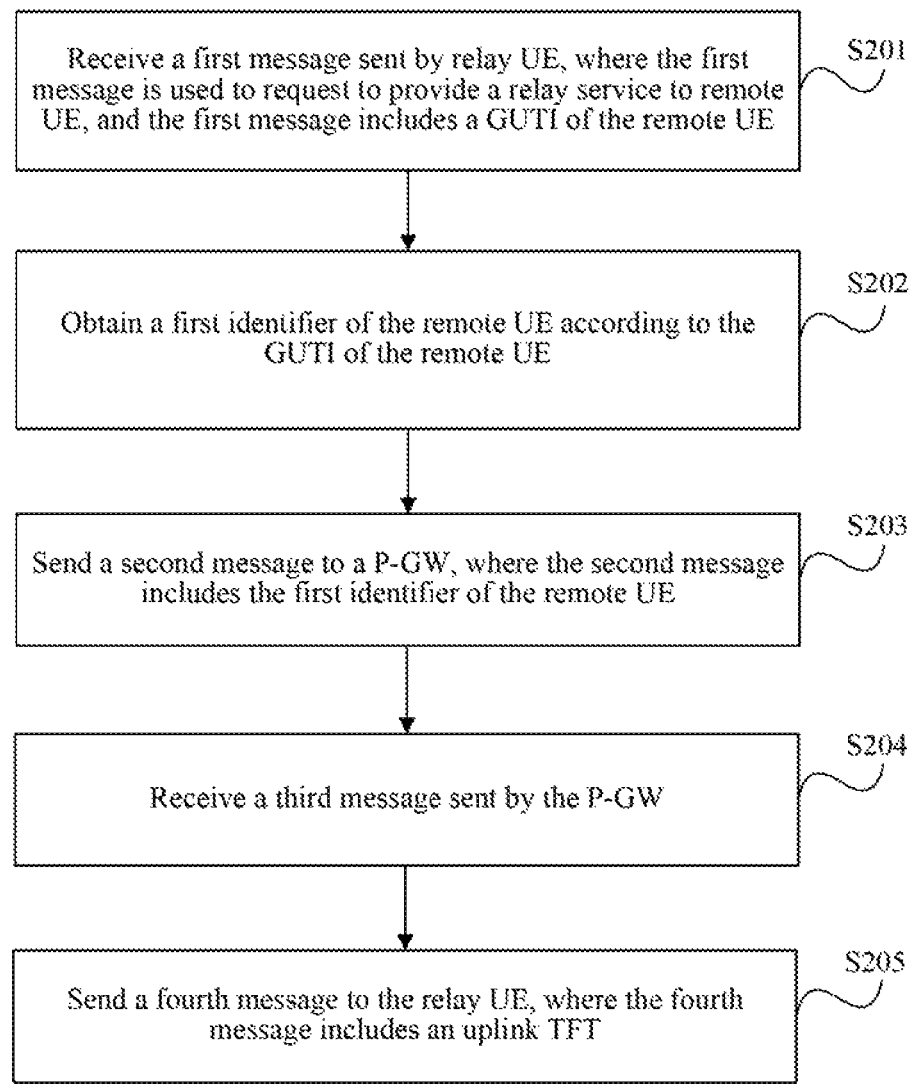
FIG. 2 is a schematic flowchart of a first embodiment of a method for providing a relay service according to the present disclosure.

FIG. 2 is a schematic flowchart of a first embodiment of a method for providing a relay service according to the present disclosure. The method is applied to an MME. As shown in FIG. 2, the method in this embodiment is as follows.

S201: Receive a first message sent by relay UE, where the first message is used to request to provide a relay service to remote UE, and the first message includes a GUTI of the remote UE.

The relay service refers to that the remote UE is outside coverage of a cell, the relay UE is within coverage of the cell, and the remote UE accesses a network by using the relay UE, to obtain a data service.

After being outside coverage of a cell, remote UE determines UE within coverage of the cell to be relay UE by using a discovery process in a ProSe technology, and sends a GUTI of the remote UE to the relay UE. The relay UE sends a first message to an MME, where the first message is used to request to provide a relay service to the remote UE. The MME receives the first message sent by the relay UE, where the first message includes the GUTI of the remote UE.

S202: Obtain a first identifier of the remote UE according to the GUTI of the remote UE.

The MME obtains context information of the remote UE according to the GUTI of the remote UE, and obtains the first identifier of the remote UE from the context information of the remote UE.

The first identifier includes an IMSI of the remote UE or an IP address of the remote UE.

In the first scenario, an MME for the remote UE to access a network when the remote UE is within coverage of the cell is the same as an MME for accessing the network by using the relay UE. Therefore, the MME includes the context information of the remote UE, and the MME may directly obtain the context information of the remote UE according to the GUTI of the remote UE, and obtain the first identifier of the remote UE from the context information of the remote UE.

In the second scenario, an MME for the remote UE to access a network when the remote UE is within coverage of the cell is different from an MME for accessing the network by using the relay UE, and the MME for accessing the network by using the relay UE is referred to as a target MME. The target MME does not include the context information of the remote UE, while the original MME includes the context information of the remote UE. The target MME determines, according to the GUTI of the remote UE, an address of the original MME corresponding to the remote UE, and sends a sixth message to the original MME, where the sixth message is used to obtain the context information of the remote UE, and the sixth message includes the GUTI of the remote UE. The original MME determines the context information of the remote UE according to the GUTI of the remote UE, and sends the context information of the remote UE to the target MME. The target MME receives the context information of the remote UE that is sent by the original MME, and the target MME obtains the first identifier of the remote UE from the context information of the remote UE.

The sixth message may further include attach request information or a tracking area update message, and the attach request information or the tracking area update message is used by the original MME to verify validity of the remote MME. After verifying the validity of the remote MME according to the attach request information, the original MME obtains the context information of the remote UE according to the GUTI of the remote UE.

S203: Send a second message to a P-GW, where the second message includes the first identifier of the remote UE.

Specifically, the MME may forward the second message to the P-GW by using an S-GW.

In the embodiments of the present disclosure, described messages sent by an MME to a P-GW may all be messages sent by the MME to the P-GW by using an S-GW, and messages sent by the P-GW to the MME may all be messages sent by the P-GW to the MME by using the S-GW.

When the P-GW receives the foregoing second message, where the second message includes the first identifier of the remote UE, the P-GW may determine an uplink packet filter of the remote UE according to the first identifier of the remote UE, and determine an uplink TFT of the relay UE according to the uplink packet filter of the remote UE. The uplink TFT of the relay UE includes the uplink packet filter that is used by the relay UE to map an uplink data packet of the remote UE to an EPS bearer of the relay UE. The P-GW sends a third message to the MME, where the third message includes the uplink TFT of the relay UE.

S204: Receive a third message sent by the P-GW.

The third message includes an uplink TFT, the uplink TFT includes an uplink packet filter of the remote UE, and the uplink packet filter of the remote UE is used by the remote UE to map an uplink data packet of the remote UE to an EPS bearer of the relay UE.

Specifically, the third message may be included in an update bearer request message sent by the P-GW.

S205: Send a fourth message to the relay UE, where the fourth message includes the uplink TFT.

The MME sends the fourth message to the relay UE, where the fourth message includes the uplink TFT. After receiving service data of the remote UE, the relay UE maps, according to the uplink TFT, an uplink data packet of the remote UE to an EPS bearer of the relay UE for uplink transmission.

In this embodiment, a first message sent by relay UE is received, where the first message is used to request to provide a relay service to remote UE, and the first message includes a GUTI of the remote UE. A first identifier of the remote UE is obtained according to the GUTI of the remote UE. A second message is sent to a P-GW, where the second message includes the first identifier of the remote UE. A third message sent by the P-GW is received, where the third message includes an uplink TFT, the uplink TFT includes an uplink packet filter of the remote UE, and the uplink packet filter of the remote UE is used by the relay UE to map an uplink data packet of the remote UE to an evolved packet data gateway EPS bearer of the relay UE. A fourth message is sent to the relay UE, where the fourth message includes the uplink TFT, so that after receiving service data of the remote UE, the relay UE maps, according to the uplink TFT, the uplink data packet of the remote UE to the EPS bearer of the relay UE for uplink transmission. The uplink TFT of the relay UE includes the uplink packet filter of the remote UE. The uplink packet filter of the remote UE is used by the relay UE to map the uplink data packet of the remote UE to the EPS bearer of the relay UE, the uplink packet filter is determined by the P-GW of the remote UE according to an existing context of the remote UE, and the context includes an IP address of the remote UE. Therefore, it is ensured that an IP address that is used by the remote UE when accessing a network by using the relay UE is consistent with an IP address that is used by the remote UE when accessing the network last time, thereby ensuring continuity of data transmission.

On the basis of the embodiment shown in FIG. 2, optionally, the third message further includes a first TFT. The first TFT is used by the relay UE to route a downlink data packet of the remote UE to a bearer on a PC5. The PC5 is an interface between the relay UE and the remote UE, and is used to support discovery and direct communication of signaling and data for relay. The fourth message further includes the first TFT and the relay UE routes the downlink data packet to different bearers on the PC5 according to the first TFT. The bearer uniquely determines one or more data streams, and these data streams are processed according to same quality of service (QoS) in a connection between the UE and the P-GW. One PDN connection has multiple bearers. Different data packets are mapped to different bearers according to different requirements on QoS. It should be noted that the first TFT may be sent in the third message, or may be sent by using another message independent of the third message. This is not limited in the present disclosure.

The MME further sends a fifth message to the P-GW, where the fifth message is used to request for a bearer resource, the fifth message is used to cause the P-GW to update a downlink TFT of the relay UE, the downlink TFT includes a downlink packet filter of the remote UE, and the downlink packet filter of the remote UE is used to map the downlink data packet of the remote UE to the EPS bearer of the relay UE. After receiving the fifth message sent by the MME, the P-GW updates the downlink TFT of the relay UE. When sending downlink data to the remote UE, the P-GW may map, according to the downlink TFT of the relay UE, a downlink data packet sent to the remote UE to the EPS bearer of the relay UE for transmission of the downlink data.

For the third scenario, in the foregoing embodiment, the first message further includes a second identifier of the remote UE, which may be, for example, a linked EPS bearer identifier (LBI) or an access point name (APN).

The MME determines an address of the P-GW of the remote UE according to the second identifier of the remote UE. If the determined address of the P-GW of the remote UE is not consistent with that of a P-GW connected to the relay UE, the MME further establishes a PDN connection between the relay UE and the P-GW.

Figure 3:
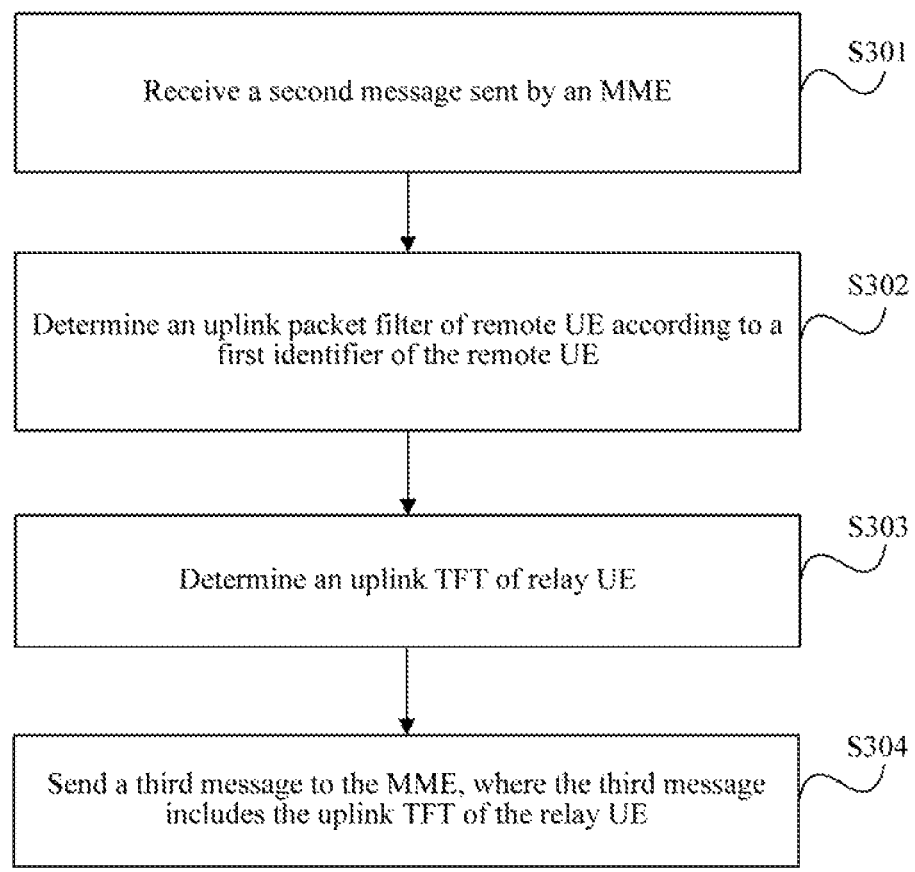
FIG. 3 is a schematic flowchart of a second embodiment of a method for providing a relay service according to the present disclosure.

FIG. 3 is a schematic flowchart of a second embodiment of a method for providing a relay service according to the present disclosure, and the method is applied to a P-GW.

This embodiment is executed by the P-GW, and the method in this embodiment is as follows.

S301: Receive a second message sent by an MME.

After being outside coverage of a cell, remote UE determines UE within coverage of the cell to be relay UE by using a discovery process in a ProSe technology, and sends a first message to the relay UE, where the first message includes a GUTI of the remote UE. The relay UE sends the first message to the MME, where the first message is used to request to provide a relay service to the remote UE. The MME receives the first message sent by the relay UE. The MME obtains context information of the remote UE according to the GUTI of the remote UE, and obtains a first identifier of the remote UE from the context information of the remote UE, where the first identifier is an IMSI of the remote UE or an IP address of the remote UE. The MME may forward a second message to the P-GW by using an S-GW, where the second message includes the first identifier of the remote UE.

S302: Determine an uplink packet filter of remote UE according to a first identifier of the remote UE.

The P-GW receives the foregoing second message, and the P-GW may obtain a context of the remote UE according to the first identifier of the remote UE, and obtain the corresponding uplink packet filter from the context.

S303: Determine an uplink TFT of relay UE.

The uplink TFT of the relay UE includes the uplink packet filter of the remote UE, and the uplink packet filter of the remote UE is used by the relay UE to map an uplink data packet of the remote UE to an evolved packet data gateway EPS bearer of the relay UE.

The P-GW sends a third message to the MME, where the third message includes the uplink TFT of the relay UE.

S304: Send a third message to the MME, where the third message includes the uplink TFT of the relay UE.

Specifically, the third message may be included in an update bearer request message sent by the P-GW.

The MME sends the uplink TFT to the relay UE. After receiving service data of the remote UE, the relay UE maps, according to the uplink TFT, an uplink data packet of the remote UE to an EPS bearer of the relay UE for uplink transmission.

In this embodiment, a second message sent by an MME is received by a P-GW. A packet filter of remote UE is determined according to a first identifier of the remote UE that is included in the second message. An uplink TFT is determined according to the packet filter of the remote UE. A third message is sent to the MME, where the third message includes the uplink TFT. The MME sends the uplink TFT to relay UE. After receiving service data of the remote UE, the relay UE maps, according to the uplink TFT, an uplink data packet of the remote UE to an EPS bearer of the relay UE for uplink transmission. The uplink TFT of the relay UE includes the uplink packet filter, the uplink packet filter of the remote UE is used by the relay UE to map the uplink data packet of the remote UE to the EPS bearer of the relay UE, the uplink packet filter is determined by a P-GW of the remote UE according to an existing context of the remote UE, and the context includes an IP address of the remote UE. Therefore, it is ensured that an IP address that is used by the remote UE when accessing a network by using the relay UE is consistent with an IP address that is used by the remote UE when accessing the network last time, thereby ensuring continuity of data transmission.

In the foregoing embodiment, the third message sent by the P-GW to the MME further includes a first TFT. The first TFT is used by the relay UE to route a downlink data packet of the remote UE to a bearer on a PC5. The PC5 is an interface between the relay UE and the remote UE, and is used to support discovery and direct communication of signaling and data for relay. The fourth message further includes the first TFT, and the relay UE routes the downlink data packet to different bearers on the PC5 according to the first TFT.

The P-GW further receives a fifth message sent by the MME, where the fifth message is used to request for a bearer resource, the fifth message is used to cause the P-GW to update a downlink TFT of the relay UE, the downlink TFT includes a downlink packet filter of the remote UE, and the downlink packet filter of the remote UE is used to map the downlink data packet of the remote UE to the EPS bearer of the relay UE. After receiving the fifth message sent by the MME, the P-GW updates the downlink TFT of the relay UE. When sending downlink data to the remote UE, the P-GW may map, according to the downlink TFT of the relay UE, the downlink data packet sent to the remote UE to the EPS bearer of the relay UE for transmission of the downlink data.

Figure 4:
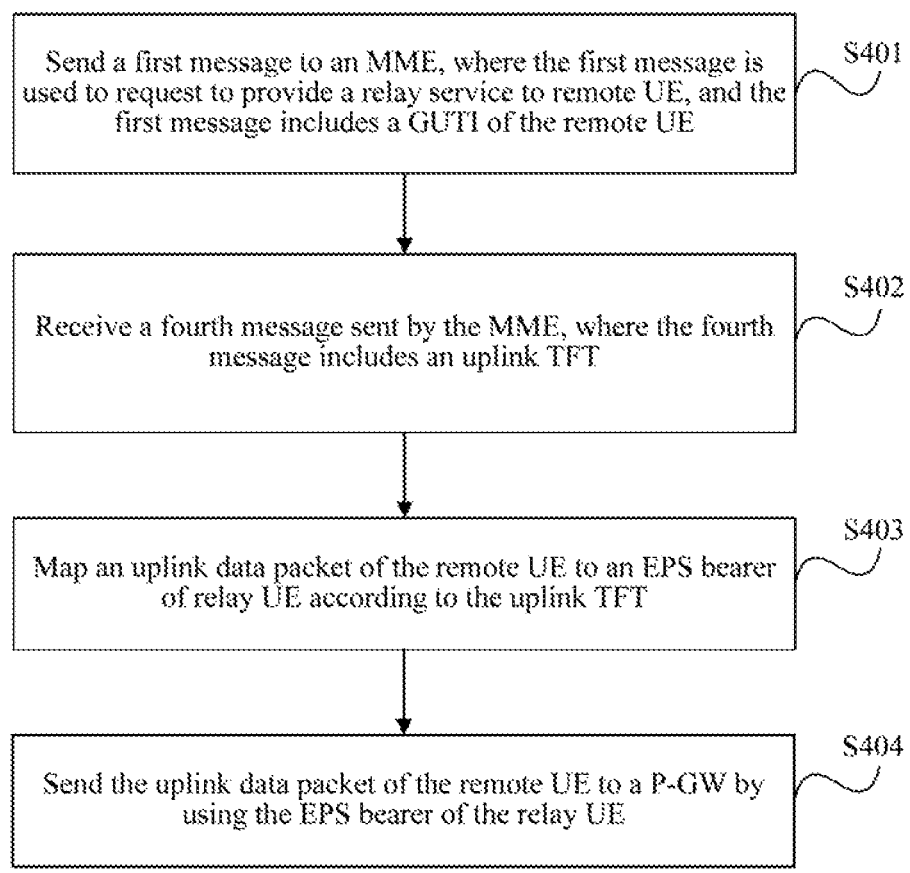
FIG. 4 is a schematic flowchart of a third embodiment of a method for providing a relay service according to the present disclosure.

FIG. 4 is a schematic flowchart of a third embodiment of a method for providing a relay service according to the present disclosure. The method is applied to relay UE, and the method in this embodiment is as follows.

S401: Send a first message to an MME, where the first message is used to request to provide a relay service to remote UE, and the first message includes a GUTI of the remote UE.

The relay service refers to that the remote UE is outside coverage of a cell, the relay UE is within coverage of the cell, and the remote UE accesses a network by using the relay UE, to obtain a data service.

For how the remote UE selects the relay UE, and sends the GUTI of the remote UE to the relay UE, and related processing of the MME and a P-GW after the relay UE sends the first message to the MME, refer to the detailed description of S201 to S204 in the embodiment shown in FIG. 1, and details are not described herein again.

S402: Receive a fourth message sent by the MME, where the fourth message includes an uplink TFT.

The uplink TFT includes an uplink packet filter of the remote UE.

S403: Map an uplink data packet of the remote UE to an EPS bearer of the relay UE according to the uplink TFT.

After receiving the data packet, the relay UE matches the data packet with the uplink packet filter, and after the matching succeeds, sends the data packet on a corresponding bearer. When the data packet is matched with the uplink packet filter, matching is performed according to priorities of uplink packet filtering one by one, until a matched uplink packet filter (for example, a wildcard filter) is found. If there is no matched filter, the UE discards the data packet.

S404: Send the uplink data packet of the remote UE to a P-GW by using the EPS bearer of the relay UE.

In this embodiment, a first message is sent to a mobility management entity MME by relay UE, where the first message is used to request to provide a relay service to remote UE, and the first message includes a GUTI of the remote UE. A fourth message sent by the MME is received, where the fourth message includes an uplink traffic flow template TFT. An uplink data packet of the remote UE is mapped to an evolved packet data EPS bearer of the relay UE according to the uplink TFT, where an uplink packet filter is determined by a P-GW of the remote UE according to an existing context of the remote UE, and the context includes an IP address of the remote UE. In this way, it is ensured that an IP address that is used by the remote UE when accessing a network by using the relay UE is consistent with an IP address that is used by the remote UE when accessing the network last time, thereby ensuring continuity of data transmission.

In the foregoing embodiment, one implementation manner is: the fourth message further includes a first TFT, and the relay UE routes a downlink data packet of the remote UE to a bearer on a PC5 according to the first TFT, where the PC5 is an interface between the relay UE and the remote UE.

Another implementation manner is: after receiving the fourth message sent by the MME, the relay UE generates a first TFT, and routes a downlink data packet of the remote UE to a bearer on a PC5 according to the first TFT, where the PC5 is an interface between the relay UE and the remote UE.

In the foregoing implementation, the relay UE further receives attach request information or a tracking area update message sent by the remote UE, where the attach request information or the tracking area update message is used by an original MME corresponding to the remote UE to verify the remote UE.

In the foregoing embodiment, the first message further includes a second identifier of the remote UE, and the second identifier is used by the MME to determine an address of the P-GW of the remote UE, and establish, for the relay UE, a packet data network PDN connection to the P-GW. The second identifier is an LBI or an APN.

Figure 5:
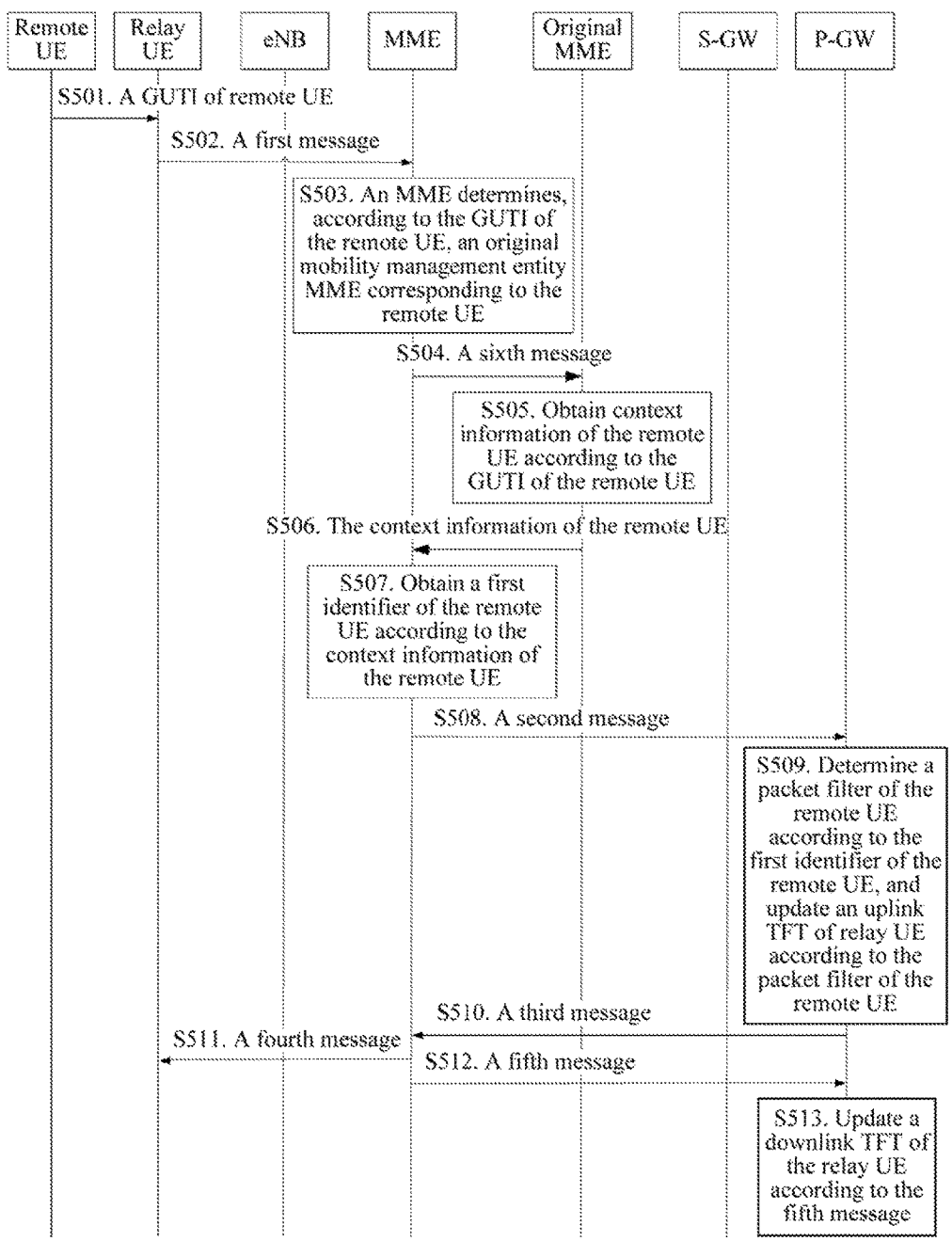
FIG. 5 is a schematic flowchart of a fourth embodiment of a method for providing a relay service according to the present disclosure.

FIG. 5 is a schematic flowchart of a fourth embodiment of a method for providing a relay service according to the present disclosure. The method in this embodiment is as follows.

S501: Remote UE sends a GUTI of the remote UE to relay UE.

S502: The relay UE sends a first message to an MME.

The first message is used to request to provide a relay service to the remote UE, and the first message includes the GUTI of the remote UE.

S503: The MME determines, according to the GUTI of the remote UE, an original mobility management entity MME corresponding to the remote UE.

S504: The MME sends a sixth message to the original MME.

The sixth message is used to obtain context information of the remote UE, and the sixth message includes the GUTI of the remote UE.

S505: The original MME obtains context information of the remote UE according to the GUTI of the remote UE.

S506: The original MME sends the context information of the remote UE to the MME.

S507: The MME obtains a first identifier of the remote UE according to the context information of the remote UE.

S508: The MME sends a second message to a P-GW by using an S-GW, where the second message includes the first identifier of the remote UE.

S509: The P-GW determines a packet filter of the remote UE according to the first identifier of the remote UE, and updates an uplink TFT of the relay UE according to the packet filter of the remote UE.

S510: The P-GW sends a third message to the MME by using the S-GW, where the third message includes an updated uplink TFT of the relay UE and a first TFT.

S511: The MME sends a fourth message to the relay UE, where the fourth message includes the uplink TFT and the first TFT.

S512: The MME sends a fifth message to the P-GW by using the S-GW.

S513: The P-GW updates a downlink TFT of the relay UE according to the fifth message.

In this embodiment, for a detailed description of each step, refer to the detailed description of a corresponding step in FIG. 2, FIG. 3, and FIG. 4, and details are not described herein again.

In this embodiment, the uplink TFT of the relay UE includes the uplink packet filter for mapping an uplink data packet of the remote UE to the EPS bearer of the relay UE. The uplink packet filter is determined by the P-GW of the remote UE according to an existing context of the remote UE, and the context includes an IP address of the remote UE. Therefore, it is ensured that an IP address that is used by the remote UE when accessing a network by using the relay UE is consistent with an IP address that is used by the remote UE when accessing the network within coverage of a cell, thereby ensuring continuity of data transmission.

Figure 6:
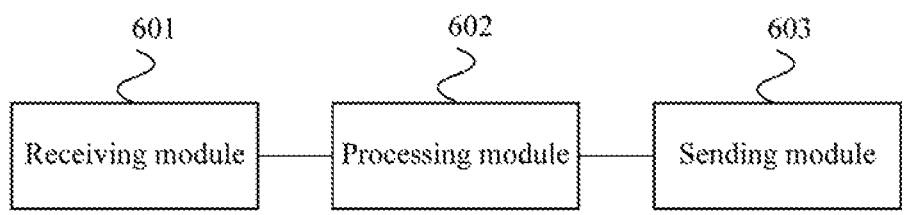
FIG. 6 is a schematic structural diagram of a first embodiment of an apparatus for providing a relay service according to the present disclosure.

FIG. 6 is a schematic structural diagram of a first embodiment of an apparatus for providing a relay service according to the present disclosure. The apparatus in this embodiment is applied to a P-GW, and the apparatus in this embodiment includes: a receiving module 601, a processing module 602, and a sending module 603. The receiving module 601 is configured to receive a second message sent by a mobility management entity MME, where the second message includes a first identifier of remote UE. The processing module 602 is configured to determine an uplink packet filter of the remote UE according to the first identifier of the remote UE. The processing module 602 is further configured to determine an uplink traffic flow template TFT of relay UE. The uplink TFT includes the uplink packet filter of the remote UE, and the uplink packet filter of the remote UE is used by the relay UE to map an uplink data packet of the remote UE to an evolved packet data gateway EPS bearer of the relay UE. The sending module 603 is configured to send a third message to the MME, where the third message includes the uplink TFT.

In the foregoing embodiment, the first identifier of the remote UE includes:

an international mobile subscriber identity IMSI of the remote UE or an Internet Protocol IP address of the remote UE.

In the foregoing embodiment, the third message further includes a first TFT, the first TFT is used by the relay UE to route a downlink data packet of the remote UE to a bearer on a PC5, and the PC5 is an interface between the relay UE and the remote UE.

In the foregoing embodiment, the receiving module 601 is further configured to receive a fifth message sent by the MME, where the fifth message is used to request for a bearer resource.

The processing module 602 is further configured to update a downlink TFT of the relay UE according to the fifth message, where the downlink TFT includes a downlink packet filter of the remote UE, and the downlink packet filter of the remote UE is used to map the downlink packet filter of the remote UE to the EPS bearer of the relay UE.

The apparatus in this embodiment may be correspondingly configured to execute the technical solution of the method embodiment shown in FIG. 3. The implementation principles and technical effects are similar, and are not further described herein.

Figure 7:
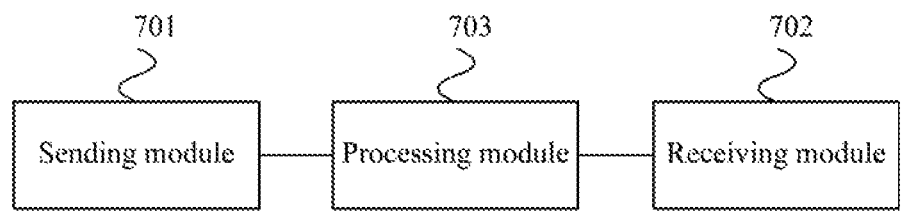
FIG. 7 is a schematic structural diagram of a second embodiment of an apparatus for providing a relay service according to the present disclosure.

FIG. 7 is a schematic structural diagram of a second embodiment of an apparatus for providing a relay service according to the present disclosure. The apparatus in this embodiment is applied to relay UE. The apparatus in this embodiment includes a sending module 701, a receiving module 702, and a processing module 703. The sending module 701 is configured to send a first message to a mobility management entity MME, where the first message is used to request to provide a relay service to remote user equipment UE, and the first message includes a globally unique temporary identity GUTI of the remote UE. The receiving module 702 is configured to receive a fourth message sent by the MME, where the fourth message includes an uplink traffic flow template TFT, and the uplink TFT includes an uplink packet filter of the remote UE. The processing module 703 is configured to map an uplink data packet of the remote UE to an evolved packet data EPS bearer of the relay UE according to the uplink TFT. The sending module 701 is further configured to send the uplink data packet of the remote UE to a packet data network-gateway P-GW by using the EPS bearer of the relay UE.

In the foregoing embodiment, the fourth message further includes a first TFT; and the processing module 703 is further configured to route a downlink data packet of the remote UE to a bearer on a PC5 according to the first TFT, where the PC5 is an interface between the relay UE and the remote UE.

In the foregoing embodiment, the processing module 703 is further configured to: generate a first TFT and route a downlink data packet of the remote UE to a bearer on a PC5 according to the first TFT, where the PC5 is an interface between the relay UE and the remote UE.

In the foregoing embodiment, the receiving module 702 is further configured to receive attach request information or a tracking area update message sent by the remote UE, where the attach request information or the tracking area update message is used by an original MME corresponding to the remote UE to verify the remote UE.

In the foregoing embodiment, the first message further includes a second identifier of the remote UE; and the second identifier is used by the MME to determine an address of the P-GW of the remote UE, and establish a packet data network PDN connection between the relay UE and the P-GW.

In the foregoing embodiment, the second identifier is a linked EPS bearer identifier LBI or an access point name APN.

The apparatus in this embodiment may be correspondingly configured to execute the technical solution of the method embodiment shown in FIG. 4. The implementation principles and technical effects are similar, and are not further described herein.

Figure 8:
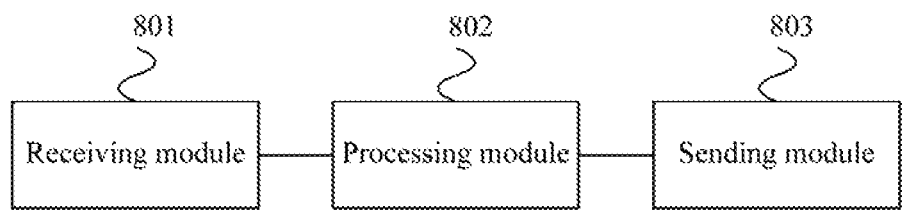
FIG. 8 is a schematic structural diagram of a third embodiment of an apparatus for providing a relay service according to the present disclosure.

FIG. 8 is a schematic structural diagram of a third embodiment of an apparatus for providing a relay service according to the present disclosure. The apparatus in this embodiment is applied to an MME. The apparatus in this embodiment includes a receiving module 801, a processing module 802, and a sending module 803. The receiving module 801 is configured to receive a first message sent by relay user equipment UE, where the first message is used to request to provide a relay service to remote UE, and the first message includes a globally unique temporary identity GUTI of the remote UE. The processing module 802 is configured to obtain a first identifier of the remote UE according to the GUTI of the remote UE. The sending module 803 is configured to send a second message to a packet data network-gateway P-GW, where the second message includes the first identifier of the remote UE. The receiving module 801 is further configured to receive a third message sent by the P-GW, where the third message includes an uplink traffic flow template TFT, the uplink TFT includes an uplink packet filter of the remote UE, and the uplink packet filter of the remote UE is used by the relay UE to map an uplink data packet of the remote UE to an evolved packet data EPS bearer of the relay UE. The sending module 803 is further configured to send a fourth message to the relay UE, where the fourth message includes the uplink TFT.

In the foregoing embodiment, the identifier of the remote UE includes: an international mobile subscriber identity IMSI of the remote UE or an Internet Protocol IP address of the remote UE.

In the foregoing embodiment, the third message further includes a first TFT, where the first TFT is used by the relay UE to route a downlink data packet of the remote UE to a bearer on a PC5, and the PC5 is an interface between the relay UE and the remote UE; and the fourth message further includes the first TFT.

In the foregoing embodiment, the sending module 803 is further configured to send the fifth message to the P-GW, where the fifth message is used to request for a bearer resource, the fifth message is used to cause the P-GW to update a downlink TFT of the relay UE, the downlink TFT includes a downlink packet filter of the remote UE, and the downlink packet filter of the remote UE is used to map the downlink data packet of the remote UE to the EPS bearer of the relay UE.

In the foregoing embodiment, the processing module 802 is specifically configured to: obtain context information of the remote UE according to the GUTI of the remote UE, and obtain the first identifier of the remote UE from the context information of the remote UE.

In the foregoing embodiment, the processing module 802 is specifically configured to determine, according to the GUTI of the remote UE, an original mobility management entity MME corresponding to the remote UE. The sending module 803 is further configured to send a sixth message to the original MME, where the sixth message is used to obtain the context information of the remote UE, and the sixth message includes the GUTI of the remote UE. The receiving module 801 is further configured to receive the context information of the remote UE that is sent by the original MME.

In the foregoing embodiment, the sixth message further includes attach request information or a tracking area update message, and the attach request information or the tracking area update message is used by the original MME to verify the remote UE.

In the foregoing embodiment, the first message further includes a second identifier of the remote UE; and the processing module 802 is further configured to: determine an address of the P-GW according to the second identifier of the remote UE, and establish a packet data network PDN connection between the relay UE and the P-GW.

In the foregoing embodiment, the second identifier is a linked EPS bearer identifier LBI or an access point name APN.

The apparatus in this embodiment may be correspondingly configured to execute the technical solution of the method embodiment shown in FIG. 2. The implementation principles and technical effects are similar, and are not further described herein.

Figure 9:
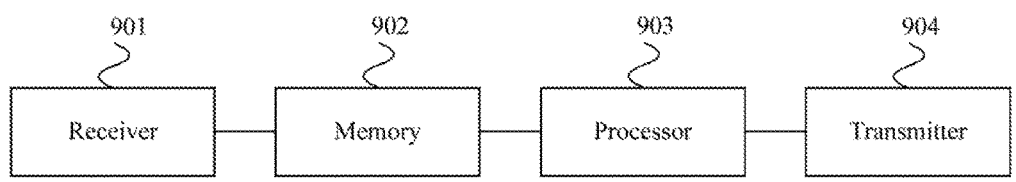
FIG. 9 is a schematic structural diagram of a fourth embodiment of an apparatus for providing a relay service according to the present disclosure.

FIG. 9 is a schematic structural diagram of a fourth embodiment of an apparatus for providing a relay service according to the present disclosure. The apparatus in this embodiment is applied to a P-GW, and the apparatus in this embodiment includes: a receiver 901, a memory 902, a processor 903, and a transmitter 904. The memory 902 is configured to store a computer executable instruction. The processor 903 is configured to execute the computer executable instruction. The receiver 901 is configured to receive a second message sent by a mobility management entity MME, where the second message includes a first identifier of remote UE. The processor 903 is configured to: determine an uplink packet filter of the remote UE according to the first identifier of the remote UE, and determine an uplink traffic flow template TFT of relay UE. The uplink TFT includes the uplink packet filter of the remote UE, and the uplink packet filter of the remote UE is used by the relay UE to map an uplink data packet of the remote UE to an evolved packet data gateway EPS bearer of the relay UE. The transmitter 904 is configured to send a third message to the MME, where the third message includes the uplink TFT.

The apparatus in this embodiment may be correspondingly configured to execute the technical solution of the method embodiment shown in FIG. 3. The implementation principles and technical effects are similar, and are not further described herein.

Figure 10:
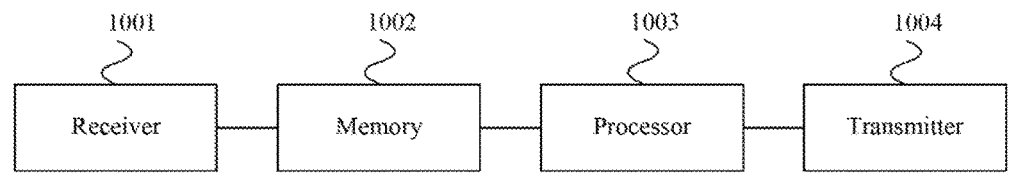
FIG. 10 is a schematic structural diagram of a fifth embodiment of an apparatus for providing a relay service according to the present disclosure.

FIG. 10 is a schematic structural diagram of a fifth embodiment of an apparatus for providing a relay service according to the present disclosure. The apparatus in this embodiment is applied to relay UE. The apparatus in this embodiment includes: a receiver 1001, a memory 1002, a processor 1003, and a transmitter 1004. The memory 1002 is configured to store a computer executable instruction. The processor 1003 is configured to execute the computer executable instruction. The transmitter 1004 is configured to send a first message to a mobility management entity MME, where the first message is used to request to provide a relay service to remote user equipment UE, and the first message includes a globally unique temporary identity GUTI of the remote UE. The receiver 1001 is configured to receive a fourth message sent by the MME, where the fourth message includes an uplink traffic flow template TFT, and the uplink TFT includes an uplink packet filter of the remote UE. The transmitter 1004 is configured to map an uplink data packet of the remote UE to an evolved packet data EPS bearer of the relay UE according to the uplink TFT. The transmitter 1004 is further configured to send the uplink data packet of the remote UE to a packet data network-gateway P-GW by using the EPS bearer of the relay UE.

The apparatus in this embodiment may be correspondingly configured to execute the technical solution of the method embodiment shown in FIG. 4. The implementation principles and technical effects are similar, and are not further described herein.

Figure 11:
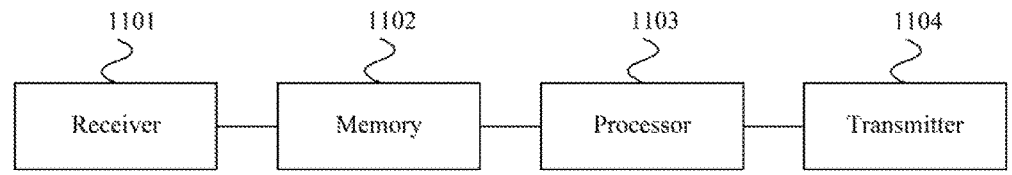
FIG. 11 is a schematic structural diagram of a sixth embodiment of an apparatus for providing a relay service according to the present disclosure.

FIG. 11 is a schematic structural diagram of a sixth embodiment of an apparatus for providing a relay service according to the present disclosure. The apparatus in this embodiment is applied to an MME. The apparatus in this embodiment includes: a receiver 1101, a memory 1102, a processor 1103, and a transmitter 1104. The memory 1102 is configured to store a computer executable instruction. The processor 1103 is configured to execute the computer executable instruction. The receiver 1101 is configured to receive a first message sent by relay user equipment UE, where the first message is used to request to provide a relay service to remote UE, and the first message includes a globally unique temporary identity GUTI of the remote UE. The processor 1103 is configured to obtain a first identifier of the remote UE according to the GUTI of the remote UE. The transmitter 1104 is configured to send a second message to a packet data network-gateway P-GW, where the second message includes the first identifier of the remote UE. The receiver 1101 is further configured to receive a third message sent by the P-GW, where the third message includes an uplink traffic flow template TFT, the uplink TFT includes an uplink packet filter of the remote UE, and the uplink packet filter of the remote UE is used by the relay UE to map an uplink data packet of the remote UE to an evolved packet data EPS bearer of the relay UE. The transmitter 1104 is further configured to send a fourth message to the relay UE, where the fourth message includes the uplink TFT.

The apparatus in this embodiment may be correspondingly configured to execute the technical solution of the method embodiment shown in FIG. 2. The implementation principles and technical effects are similar, and are not further described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for providing a relay service, applied to a mobility management entity (MME), comprising:
   receiving a first message sent by a relay user equipment (UE), wherein the first message is used to request to provide the relay service to a remote UE, and the first message comprises a globally unique temporary identity (GUTI) of the remote UE;
   obtaining a first identifier of the remote UE according to the GUTI of the remote UE;
   sending a second message to a packet data network-gateway (P-GW), wherein the second message comprises the first identifier of the remote UE;
   receiving a third message sent by the P-GW, wherein the third message comprises an uplink traffic flow template (TFT), the uplink TFT comprises an uplink packet filter of the remote UE, and the uplink packet filter of the remote UE is used by the relay UE to map an uplink data packet of the remote UE to an evolved packet data (EPS) bearer of the relay UE; and
   sending a fourth message to the relay UE, wherein the fourth message comprises the uplink TFT,
   wherein the first message further comprises a second identifier of the remote UE, and the method further comprises determining an address of the P-GW according to the second identifier of the remote UE, and establishing a packet data network (PDN) connection between the relay UE and the P-GW.

2. The method according to claim 1, wherein the identifier of the remote UE comprises: an international mobile subscriber identity (IMSI) of the remote UE or an Internet Protocol (IP) address of the remote UE.

3. The method according to claim 1, wherein the third message further comprises a first TFT, the first TFT is used by the relay UE to route a downlink data packet of the remote UE to a bearer on a PC5 interface between the relay UE and the remote UE; and the fourth message further comprises the first TFT.

4. The method according to claim 1, wherein after the sending the fourth message to the relay UE, the method further comprises:
   sending a fifth message to the P-GW, wherein the fifth message is used to request for a bearer resource, the fifth message is used to cause the P-GW to update a downlink TFT of the relay UE, the downlink TFT comprises a downlink packet filter of the remote UE, and the downlink packet filter of the remote UE is used to map the downlink data packet of the remote UE to the EPS bearer of the relay UE.

5. The method according to claim 1, wherein the obtaining a first identifier of the remote UE according to the GUTI of the remote UE comprises:
   obtaining context information of the remote UE according to the GUTI of the remote UE, and obtaining the first identifier of the remote UE from the context information of the remote UE.

6. The method according to claim 5, wherein the obtaining context information of the remote UE according to the GUTI of the remote UE comprises:
   determining, according to the GUTI of the remote UE, an original mobility management entity MME corresponding to the remote UE;
   sending a sixth message to the original MME, wherein the sixth message is used to obtain the context information of the remote UE, and the sixth message comprises the GUTI of the remote UE; and
   receiving the context information of the remote UE that is sent by the original MME.

7. The method according to claim 6, wherein the sixth message further comprises attach request information or a tracking area update message, and the attach request information or the tracking area update message is used by the original MME to verify the remote UE.

8. The method according to claim 1, wherein the second identifier is a linked EPS bearer identifier (LBI) or an access point name (APN).

9. A method for providing a relay service, applied to relay user equipment UE, comprising:
   sending a first message to a mobility management entity (MME), wherein the first message is used to request to provide the relay service to a remote (UE), and the first message comprises a globally unique temporary identity (GUTI) of the remote UE;
   receiving a fourth message sent by the MME, wherein the fourth message comprises an uplink traffic flow template (TFT), and the uplink TFT comprises an uplink packet filter of the remote UE;
   mapping an uplink data packet of the remote UE to an evolved packet data (EPS) bearer of the relay UE according to the uplink TFT; and
   sending the uplink data packet of the remote UE to a packet data network-gateway (P-GW) by using the EPS bearer of the relay UE, wherein the first message further comprises a second identifier of the remote UE, and the second identifier is used by the MME to determine an address of the P-GW of the remote UE, and establish a packet data network (PDN) connection between the relay UE and the P-GW.

10. The method according to claim 9, wherein the fourth message further comprises a first TFT; and the method further comprises:
   routing a downlink data packet of the remote UE to a bearer on a PC5 interface according to the first TFT, wherein the PC5 is an interface between the relay UE and the remote UE.

11. The method according to claim 9, wherein after the receiving a fourth message sent by the MME, the method further comprises:
   generating a first TFT; and
   routing a downlink data packet of the remote UE to a bearer on a PC5 interface according to the first TFT, wherein the PC5 is an interface between the relay UE and the remote UE.

12. The method according to claim 9, wherein before the sending a first message to an MME, the method further comprises:
   receiving attach request information or a tracking area update message sent by the remote UE, wherein the attach request information or the tracking area update message is used by an original MME corresponding to the remote UE to verify the remote UE.

13. The method according to claim 9, wherein the second identifier is a linked EPS bearer identifier (LBI) or an access point name (APN).

14. A User equipment (UE) for providing a relay service, comprising:
   a transceiver;
   a memory comprising instructions; and
   a processor coupled to the transceiver and the memory, wherein when executed by the processor, the instructions cause the processor to be configured to:
   send, via the transceiver, a first message to a mobility management entity (MME), wherein the first message is used to request to provide a relay service to remote UE, and the first message comprises a globally unique temporary identity (GUTI) of the remote UE;
   receive, via the transceiver, a fourth message sent by the MME, wherein the fourth message comprises an uplink traffic flow template (TFT), and the uplink TFT comprises an uplink packet filter of the remote UE;
   map an uplink data packet of the remote UE to an evolved packet data (EPS) bearer of the relay UE according to the uplink TFT; and
   send, via the transceiver, the uplink data packet of the remote UE to a packet data network-gateway (P-GW) by using the EPS bearer of the relay UE, wherein the first message further comprises a second identifier of the remote UE, and the second identifier is used by the MME to determine an address of the P-GW of the remote UE, and establish a packet data network (PDN) connection between the relay UE and the P-GW.

15. The user equipment according to claim 14, wherein the fourth message further comprises a first TFT; and the instructions further cause the processor to be configured to:
   route a downlink data packet of the remote UE to a bearer on a PC5 interface according to the first TFT, wherein the PC5 is an interface between the relay UE and the remote UE.

16. The user equipment according to claim 14, wherein the instructions further cause the processor to be configured to:
   generate a first TFT; and
   route a downlink data packet of the remote UE to a bearer on a PC5 interface according to the first TFT, wherein the PC5 is an interface between the relay UE and the remote UE.

17. The user equipment according to claim 14, wherein the instructions further cause the processor to be configured to:
 receive, via the transceiver, attach request information or a tracking area update message sent by the remote UE, wherein the attach request information or the tracking area update message is used by an original MME corresponding to the remote UE to verify the remote UE.

\* \* \* \* \*